United States Patent Office 3,534,038
Patented Oct. 13, 1970

1

3,534,038
ANTHRAPYRIMADONE AND ANTHRAPYRIDONE DYESTUFFS CONTAINING AN N-METHYLENE-CARBOXAMIDE GROUP
Heinz Machatzke, Leverkusen, Germany, assignor to Farbenfabriken Bayer Aktiengesellschaft, Leverkusen, Germany, a corporation of Germany
No Drawing. Filed Nov. 4, 1966, Ser. No. 591,969
Claims priority, application Germany, Nov. 16, 1965,
F 47,688
Int. Cl. C09b 5/14, 5/16
U.S. Cl. 260—256.4
8 Claims

ABSTRACT OF THE DISCLOSURE

Anthraquinone dyestuffs suitable for producing light and wet-fast dyeings on textiles such as wool, silk and polyamides of the formula

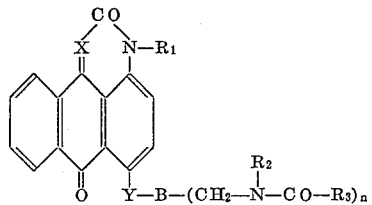

wherein X is $>$N—, $>$CH$_2$ or $\geqslant$C-acyl, Y is —N(R)—, —O—, or —S—, R, R$_1$ and R$_2$ are hydrogen or alkyl, R$_3$ is alkyl, alkoxy, alkenyl, aryl or amino, B is arylene of the benzene or naphthalene series and $n$ is 1 or 2.

---

The present invention relates to new sulphonic acid group-free dyestuffs of the formula

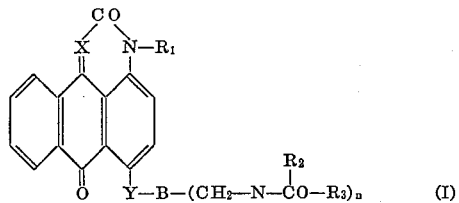

In this formula, X represents a ring member $>$N—, $>$CH— or $\geqslant$C-acyl, "acyl" standing for an acyl radical, except a sulphonic acid group, Y is a group —N(R)—, —O— or —S—, wherein R stands for hydrogen or alkyl, R$_1$ and R$_2$ mean hydrogen or alkyl groups, R$_3$ an alkyl, alkoxy, alkenyl or aryl radical or an amino group, B an arylene radical of the benzene or naphthalene series and $n$ is the number 1 or 2; the alkyl, alkoxy, alkenyl, aryl and amino radicals may carry further substituents, with the exception of sulphonic acid groups.

The groups R$_1$ and R$_2$ preferably stand for hydrogen or for lower alkyl groups, such as for the methyl or ethyl group.

Examples for the radical R$_3$ are inter alia the following groups: —CH$_3$, —CH$_2$Cl, —CHCl$_2$, —CCl$_3$, —C$_2$H$_5$, —CH$_2$CH$_2$Cl, —CH=CH$_2$, —C=CH$_2$, —C=CCl$_2$, —C=CH$_2$
  |         |          |
  Cl        Cl         CH$_3$ —C$_3$H$_7$, —CH$_2$—CH=CH$_2$, —CH=CH—CH$_2$Cl,

—CH$_2$—O—SO$_2$CH$_3$

—CH$_2$CH$_2$—O—SO$_2$C$_6$H$_5$, —CH$_2$CH$_2$—SO$_2$CH$_3$,

—CH$_2$CH$_2$SO$_2$—C$_6$H$_5$, —CH$_2$—O—C$_6$H$_5$

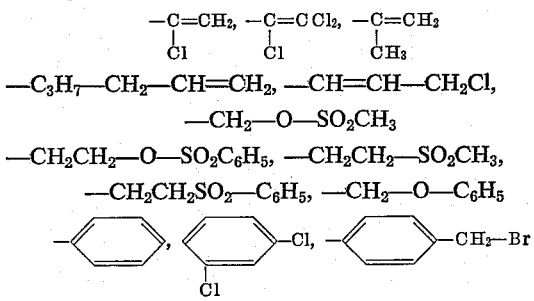

2

—NH$_2$, —NHCH$_3$, —N(CH$_3$)$_2$, —NH—CH$_2$OH,

—OCH$_3$ and —O—C$_2$H$_5$.

According to definition, benzene or naphthalene rings, which may contain further substituents, such as —CH$_3$, —OH, —OCH$_3$, —S—CH$_3$, —NH$_2$ or —NH—CH$_3$ groups, may be used as grouping B. Suitable $\geqslant$C-acyl ring members are, for example, $\geqslant$C—COCH$_3$ and $\geqslant$C—COC$_2$H$_5$.

The new dyestuffs are obtained by reacting dyestuffs of the general formula

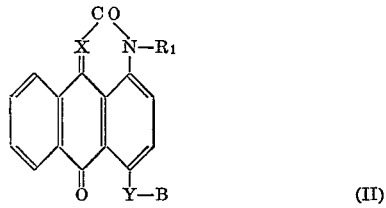

in which X, Y, R$_1$ and B have the same meaning as above and B contains at least one exchangeable hydrogen atom, in the presence of a strongly acidic condensing agent, e.g. 80–100% sulphuric acid or mixtures of glacial acetic acid and hydrochloric acid, but also 100% phosphoric acid, preferably at temperatures from 0 to 30° C., with methylol compounds or their derivatives of the general formula

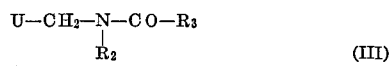

wherein R$_2$ and R$_3$ have the same meaning as above and U represents a hydroxyl or alkoxy group, e.g. the methoxy or ethoxy group, or a halogen atom, e.g. chlorine, selecting the starting components free from sulphonic acid groups.

The new dyestuffs can also be obtained in such a way that dyestuffs intermediate products of the formula

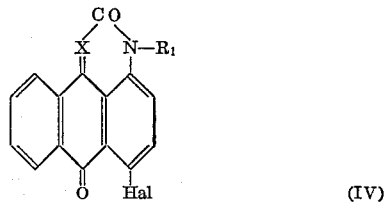

in which Hal means a halogen atom, especially —Cl or —Br, and X, and R$_1$ have the same meaning as above, are condensed with compounds of the formula

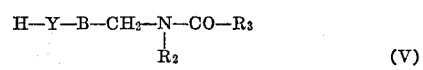

in which Y. B, R$_2$ and R$_3$ have the same meaning as above, by known methods, for example by melting the starting components, optionally with the addition of alkaline agents, selecting the starting components free from sulphonic acid groups.

Components II or IV suitable for both reactions are, for example:

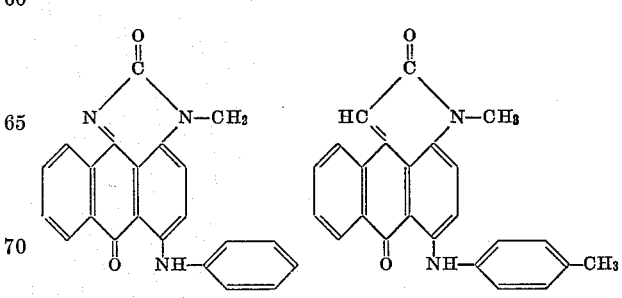

3,534,038

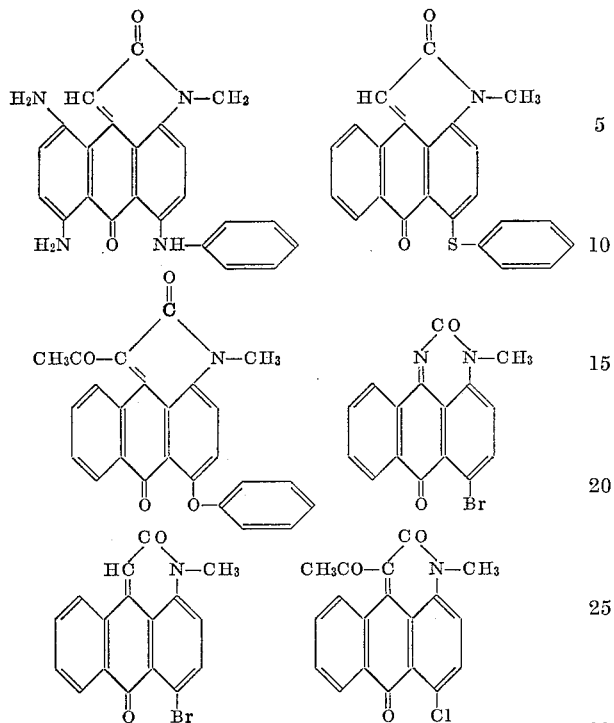

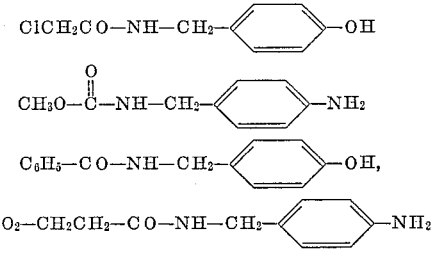

Suitable components III or V include, inter alia:
HOCH₂NHCOCH₃, HO—CH₂NH—CO—OC₂H₅
HO—CH₂NH—CO—CH₂Cl,
HOCH₂NHCOC=CH₂, HOCH₂NHCOC=CH₂
         |                |
         CH₃              Cl
HOCH₂NH—CO—C₆H₅, HOCH₂NH—CO—⟨C₆H₄⟩—CH₂Cl HO—CH₂NHCOCH₂CH₂—SO₂CH₃,
HO—CH₂NH—COCH₂CH₂Cl
HO—CH₂NH—CO—CH₂N(CH₃)₂,
Cl—CH₂NH—COCH₂Cl, Cl—CH₂—NH—CO—C₆H₅
Cl—CH₂—NH—CO—C₃H₇,
CH₃O—CH₂NH—COCH₂Cl
CH₃O—CH₂—NH—CO—CH=CH₂,
CH₃O—CH₂—NH—CO—C=CH₂,  HO—CH₂N—CO—CH₃
                |                 |
                CH₃               CH₃
ClCH₂—CO—NH—CH₂—⟨C₆H₄⟩—NH₂
ClCH₂CO—NH—CH₂—⟨C₆H₄⟩—OH
CH₃O—C(O)—NH—CH₂—⟨C₆H₄⟩—NH₂
C₆H₅—CO—NH—CH₂—⟨C₆H₄⟩—OH,
CH₃SO₂—CH₂CH₂—CO—NH—CH₂—⟨C₆H₄⟩—NH₂

The new dyestuffs are sparingly soluble to insoluble in water. They are particularly suitable, in dispersed form if desired, for the dyeing and printing of nitrogen-containing fibres, such as wool, silk and especially synthetic superpolyamide fibres; dyeings and prints with good fastness properties, such as fastness to light and wet processing, are obtained on these materials.

In the following examples, which are given for the purpose of illustrating the invention, the parts are parts by weight; the temperatures are given in degrees centigrade.

EXAMPLE 1

367 parts 4-(toluidino)-N-methyl-anthrapyrimidone are dissolved in 1000 parts 96% sulphuric acid at a temperature of 0–5°, subsequently adding 150 parts N-methylolchloracetamide in portions. The reaction mixture is then stirred for 24 hours at 20° and poured on to 5 kg. ice. The precipitated dyestuff is filtered off with suction and washed until neutral. It is dried in a drying cabinet at 60° and there are obtained 410 parts of the dyestuff of the constitution

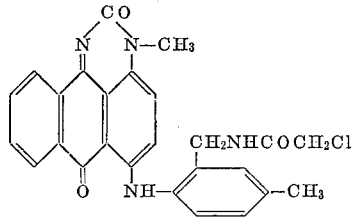

which dyes wool and synthetic superpolyamide fibres in red-violet shades.

When the procedure is followed as described in this example, but if, instead of the dyestuff and of the methylolchloroacetamide there used, equivalent quantities of the dyestuffs and methylolamides set out in Table 1, are employed, further valuable anthraquinone dyestuffs are obtained which dye synthetic superpolyamide fibres in the specified shades.

TABLE 1

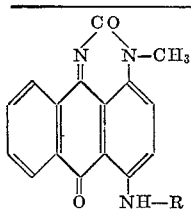

| R | Plus methylol compound | Shade on superpolyamide |
|---|---|---|
| Phenyl | HOCH₂NHCOCH₃ | Red-violet. |
| Phenyl | HOCH₂NHCOCH₂Cl | Do. |
| Phenyl | HOCH₂NHCO—C=CH₂<br>          \|<br>          Cl | Do. |
| Phenyl | HOCH₂NHCOCH=CH₂ | Do. |
| 4'-methylphenyl | HOCH₂NHCO—OCH₃ | Do. |
| 4'-methylphenyl | HOCH₂NHCO—C₆H₅ | Do. |
| 4'-methoxyphenyl | HOCH₂NHCO—O—C₂H₅ | Do. |
| 4'-methoxyphenyl | HOCH₂NHCO—C=CH₂<br>          \|<br>          CH₃ | Do. |
| 2',4'-dimethylphenyl | HOCH₂NHCOCH₃ | Do. |
| 2',4'-dimethylphenyl | HOCH₂NHCOCH₂CH₂SO₂CH₃ | Do. |

EXAMPLE 2

160 parts 4-(p-toluidino)-N-methyl-anthrapyridone are dissolved at a temperature of 0–5° in 700 parts 96% sulphuric acid. 110 parts N-methylol-chloracetamide are then added and the reaction mixture is stirred at 20° for 24 hours. It is then poured on to 3 kg. ice and the precipitated dyestuff filtered off with suction. The product is washed until neutral, dried at 60° in a drying cabinet and there are obtained 210 parts of the dyestuff of the constitution

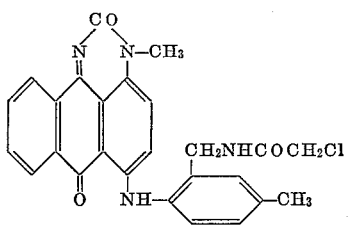

When the procedure is followed as described in this example but, instead of the dyestuff and the methylol chloracetamide mentioned, equivalent quantities of the dyestuff and methylolamides are used, which are set out in Table 2, further valuable anthraquinone dyestuffs are obtained which dye superpolyamide fibres in the specified shades.

hank are introduced into this dyebath and the temperature is slowly raised to 100°. After dyeing for 1 hour at this temperature, the fibre material is rinsed, washed and dried. A brilliant red-violet dyeing of good fastness properties is obtained.

EXAMPLE 4

10 parts of the dyestuff obtainable according to Example 2 are ground with 10 parts of a naphthalene-formaldehyde condensation product and stirred into 10 litres water at pH 6, followed by the addition of 10 parts of a levelling agent. 1000 parts of a synthetic polyamide fibre material are introduced into this dyebath and the temperature is slowly raised to 100°. After dyeing for one hour at this temperature, the fibre material is rinsed, washed and dried. A brilliant red-violet dyeing of very good fastness to light and washing is obtained.

EXAMPLE 5

30 parts of the anthraquinone of the formula

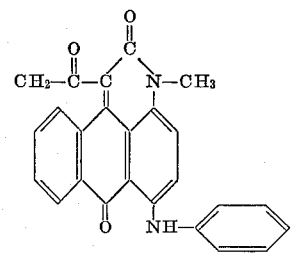

TABLE 2

| R | Plus methylol compound | Shade on superpolyamide |
|---|---|---|
| Phenyl | HOCH₂NHCOCH₃ | Red-violet. |
| Phenyl | HOCH₂NHCOCH₂Cl | Do. |
| Phenyl | HOCH₂NHCOCH=CH₂ | Do. |
| Phenyl | HOCH₂NHCOC(Cl)=CH₂ | Do. |
| Phenyl | HOCH₂NHCO—C(CH₃)=CH₂ | Do. |
| Phenyl | HOCH₂NHCO—C₆H₅ | Do. |
| 4'-methylphenyl | HOCH₂NHCO—C(CH₃)=CH₂ | Do. |
| 4'-methylphenyl | HOCH₂NHCO—C(Cl)=CH₂ | Do. |
| 4'-methoxyphenyl | HOCH₂NHCO—OCH₃ | Do. |
| 4'-methoxyphenyl | HOCH₂NHCOCH₂CH₂SO₂CH₃ | Do. |
| 2',5'-dimethylphenyl | HOCH₂NHCO—OC₂H₅ | Do. |
| 2',5'-dimethylphenyl | HOCH₂NHCO—CH₂Cl | Do. |
| Phenyl | CH₃OCH₂NHCONH₂ | Do. |
| Phenyl | CH₃OCH₂NHCONHCH₃ | Do. |
| Phenyl | CH₃OCH₂NHCON(C₂H₅)₂ | Do. |
| Phenyl | HOCH₂N(CH₃)—CO—C₆H₅ | Do. |

EXAMPLE 3

10 parts of the dyestuff obtainable according to Example 1 are ground with 10 parts of a naphthalene-formaldehyde condensation product and stirred into 10 litres water at pH 5, adding 10 parts of a levelling agent, e.g. an alkyl-phenyl-polyglycol ether. 1000 parts of a wool are dissolved at a temperature of 0–5° in 600 parts 96% sulphuric acid. 22 parts N-methylol-acetamide are then added in 20 minutes and the reaction mixture is stirred at 5–10° for 4 hours and subsequently at 20° for 18 hours. It is then poured on to 2 kg. ice and the precipitated dyestuff filtered off with suction. The product is washed until neutral, dried and there are obtained 38 parts of the dyestuff of the formula

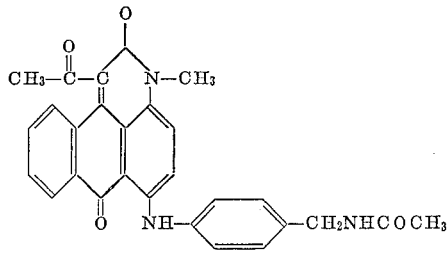

The dyestuff dyes superpolyamide fibres in red shades of good fastness properties.

EXAMPLE 6

30 parts 4-phenylamino-anthrapyridone are dissolved in 500 parts 96% sulphuric acid at a temperature of 0–5°. 18 parts methoxymethylurea are then added and the reaction mixture is stirred at 15–20° for 24 hours and subsequently poured on to ice. The precipitated dyestuff is filtered off with suction, washed until neutral and dried. There are obtained 34 parts of the dyestuff of the formula

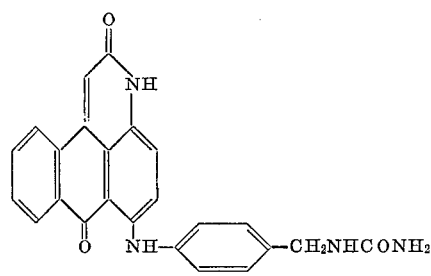

which dyes superpolyamide fibres in bluish red shades of good fastness properties.

EXAMPLE 7

25 parts 4-(N-methylphenylamino)-N-methyl-anthrapyridon are dissolved in 450 parts 96% sulphuric acid and 19 parts N-methylol-acetamide added at a temperature of 0–5°. The reaction mixture is stirred for 20 hours at a temperature of 15–20° and subsequently poured on to 2 kg. ice. The precipitated dyestuff is filtered off with suction, washed until neutral and dried in a drying cabinet at 60–80°. There are obtained 31 parts of the dyestuff of the formula

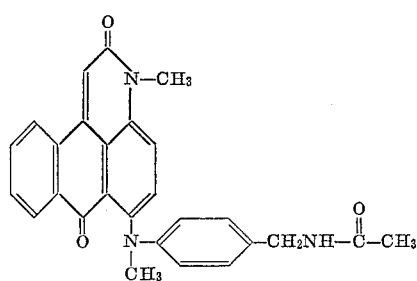

which dyes superpolyamide fibres in red shades of good fastness properties.

EXAMPLE 8

250 parts 4-acetylaminomethylen-aniline, 10 parts sodium carbonate and 50 parts 4-bromo-N-methyl-anthrapyridone are heated for 5–6 hours at a temperature of 180–185°. After cooling at 70° the reaction mixture is diluted with 200 parts methanol and the precipitated dyestuff is filtered off with suction and washed with methanol and subsequently with water. After drying 56 parts of the dyestuff of the formula

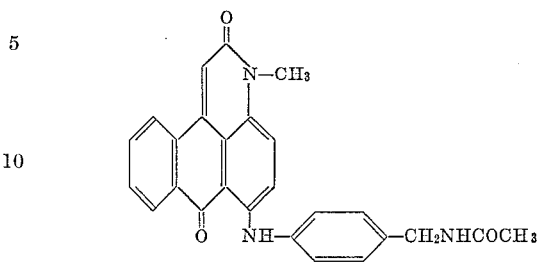

are obtained which dyes superpolyamide fibres and wool in reddish violet shades of good fastness to wet processing.

EXAMPLE 9

280 parts 4-propionylaminomethylen-thiophenol, 10 parts sodium carbonate and 50 parts 4-bromo-N-methyl-anthrapyridone are heated at 160–170° for 4–5 hours. After cooling the reaction mixture is diluted with 300 parts methanol and the precipitated dyestuff is filtered off with suction and washed with methanol and subsequently with water. After drying there are obtained 53 parts of the dyestuff of the formula

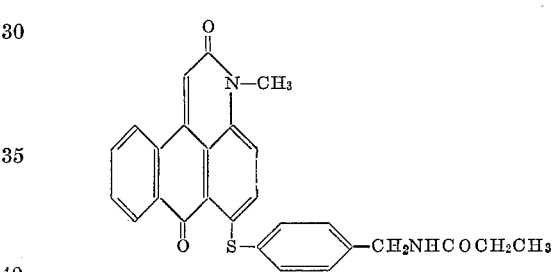

which dyes superpolyamide fibres in red shades of good fastness properties.

EXAMPLE 10

30 parts of 4-phenoxy-N-methyl-anthrapyridone are dissolved in 350 parts 96% sulphuric acid at a temperature of 0–5°. 25 parts N-methylolchloroacetamide are added and the reaction mixture is stirred for 20 hours at a temperature of 10–15° and subsequently poured on to ice. The precipitated dyestuff is filtered off with suction, washed until neutral and dried in a drying cabinet at 60°. There are obtained 42 parts of the dyestuff of the formula

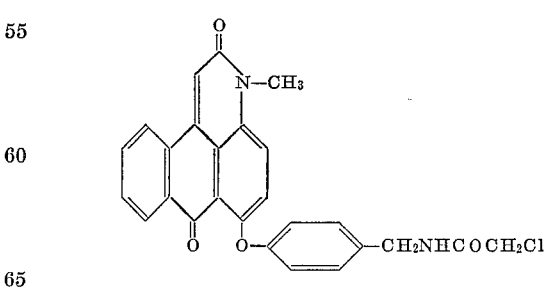

which dyes superpolyamide fibres in red shades of good fastness properties.

EXAMPLE 11

35 parts 4-(1'-naphthylamino)-N-methyl-anthrapyridone are dissolved at a temperature of 0–5° in 400 parts 96% sulphuric acid. 23 parts N-methylol-acetamide are added and the reaction mixture is stirred for 22 hours at a temperature of 10–15° and subsequently poured on to ice. The precipitated dyestuff is filtered off with suction 3,534,038 washed until neutral and dried. There are obtained 43 parts of the dyestuff of the formula

[Structure: anthraquinone with N-CH3 acetamide group and NH-naphthyl-CH2NHCOCH3 substituent]

which dyes superpolyamide fibres in red shades of good fastness properties.

I claim:
1. Dyestuff free from sulfonic acid groups and corresponding to the formula

[Structure with X, N-R1, Y-B-(CH2-N(R2)-CO-R3)n substituents on anthraquinone]

in which
X is =N—, >CH—, ≥C—COCH3 or ≥C—COC2H5;
Y is >NH, >NCH3, —O—, or —S—;
$R_1$ and $R_2$ are hydrogen or lower alkyl;
$n$ is 1 or 2;
$R_3$ is —CH3, —C2H5, —CH=CH2, —C=CH2 (Cl), —C=CCl2 (Cl), —C=CH2 (CH3)

—C3H7, —CH2—CH=CH2, —CH=CH—CH2Cl, —CH2—O—SO2CH3, —CH2CH2—O—SO2—C6H5, —CH2CH2—SO2—CH6H5, —CH2O—C6H5,

—C6H5, —C6H4—Cl (Cl), —C6H4—CH2—Br

—NH2, —NHCH3, —N(CH3)2, —N(C2H5)2, —NH—CH2OH

—C6H4—CH2—Cl

—OCH3 and —O—C2H5; and
B is phenyl or naphthyl or phenyl or naphthyl substituted with —CH3, —OH, —OCH3, —SCH3, —NH2, or —NHCH3.

2. Dyestuff free from sulfonic acid groups and corresponding to the formula
in which

[Structure with X, N-R1, Y-B-(CH2-N(R2)-CO-R3)n substituents]

X is =N—, >CH—, ≥C—COCH3 or ≥C—COC2H5;
Y is —O— or —S—;

R, $R_1$ and $R_2$ are hydrogen or lower alkyl;
$n$ is 1 or 2;
$R_3$ is —CH3, —CH2Cl, —CHCl2, —CCl3, —C2H5, —CH2CH2Cl, —CH=CH2, —C=CH2 (Cl), —C=CCl2 (Cl), —C=CH2 (CH3), —C3H7

—CH2—CH=CH2, —CH=CH—CH2Cl, —CH2—O—SO2CH3, —CH2CH2—O—SO2—C6H5,

—C6H5, —C6H4—Cl (Cl)

—CH2CH2—SO2CH3, —CH2CH2—SO2—C5H6, —CH2—O—C6H5,

—C6H4—CH2—Br

—NH2, —NHCH3, —N(CH3)2, —N(C2H5)2, —NH—CH2OH,

—C6H4—CH2—Cl

—OCH3 and —O—C2H5; and
B is phenyl or naphthyl or phenyl or naphthyl substituted with —CH3, —OH, —OCH3, —SCH3, —NH2 or —NHCH3.

3. The dyestuff of claim 1 wherein X is >N—, >CH— or ≥C—COCH3; Y is >NH, >NCH3, —O— or —S—; $R_1$ and $R_2$ are H— or —CH3; $R_3$ is —CH3, —C2H5, —C=CH2 (Cl)

CH=CH2, —OCH3, —C6H5, —OC2H5,

—C=CH2 (CH3)

—CH2CH2SO2CH3, —NH2, —NHCH3, —N(C2H5)2;
B is phenyl, 4' methylphenyl, 4' methoxyphenyl, 2'4' dimethylphenyl, or naphthyl, and $n$ is 1 or 2.

4. The dyestuff of the formula

[Structure: anthraquinone with N-CH3 and NH-phenyl-CH3 with CH2NHCOCH2Cl]

5. The dyestuff of the formula

[Structure: anthraquinone with N-CH2 and NH-phenyl-CH2NHCOCH3]

6. The dyestuff of the formula
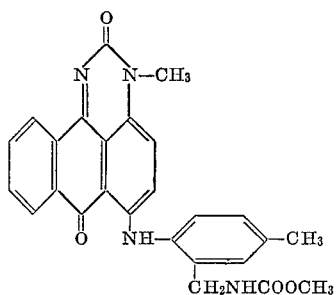
7. The dyestuff of the formula
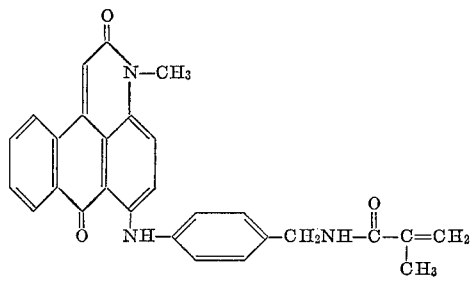
8. The dyestuff of the formula
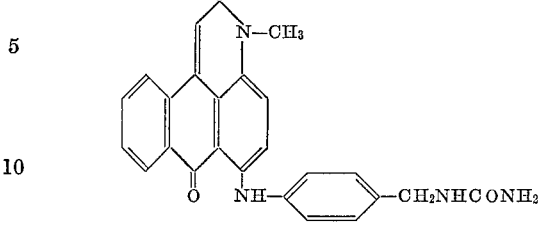
References Cited
UNITED STATES PATENTS
| | | | |
|---|---|---|---|
| 2,029,007 | 1/1936 | Weinand | 260—278 |
| 2,759,939 | 8/1956 | Bucheler et al. | 260—278 |
| 2,871,240 | 1/1959 | Randall et al. | 260—256.4 |
| 2,962,497 | 11/1960 | Guenthard | 260—278 XR |
OTHER REFERENCES
Geigy, Chemical Abstracts, vol. 57, pp. 9262–9263 (1963).
FLOYD D. HIGEL, Primary Examiner
U.S. Cl. X.R.
8—4, 34, 39, 62, 70; 260—261, 278

UNITED STATES PATENT OFFICE
CERTIFICATE OF CORRECTION

Patent No. U.S. 3,534,038          Dated October 13, 1970

Inventor(s) Heinz Machatzke

It is certified that error appears in the above-identified patent and that said Letters Patent are hereby corrected as shown below:

| Column | Line | Error |
|---|---|---|
| 1 | 40-45 | " $\begin{array}{c} R_2 \\ \| \\ -CH_2-N-CO-R_3)n \end{array}$ " should read --- $\begin{array}{c} R_2 \\ \| \\ -(CH_2-N-CO-R_3)_n \end{array}$ --- |
| 1 | 60-65 | "$-C_3H_7-CH_2-CH=CH_2$," should read --- $-C_3H_7$, $-CH_2-CH=CH_2$, --- |
| 2 | 60-65 | " $\begin{array}{c} \diagdown \\ N-CH_2 \\ \| \end{array}$ " should read --- $\begin{array}{c} \diagdown \\ N-CH_3 \\ \| \end{array}$ --- |
| 3 | 5 | " $\begin{array}{c} \diagdown \\ N-CH_2 \\ \| \end{array}$ " should read --- $\begin{array}{c} \diagdown \\ N-CH_3 \\ \| \end{array}$ --- |
| 5 | 10-15 | " $\begin{array}{c} CO \\ / \quad \diagdown \\ N \quad N \\ \| \quad \| \end{array}$ " should read --- $\begin{array}{c} CO \\ / \quad \diagdown \\ CH \quad N \\ \| \quad \| \end{array}$ --- |

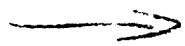

UNITED STATES PATENT OFFICE
CERTIFICATE OF CORRECTION

Patent No. U.S. 3,534,038          Dated  October 13, 1970

Inventor(s) Heinz Machatzke          PAGE - 2

It is certified that error appears in the above-identified patent and that said Letters Patent are hereby corrected as shown below:

| Column | Line | Error |
|---|---|---|
| 6 | 20-25 | "CH$_2$-C-" should read --- CH$_3$-C- --- |
| 9 | 5-10 | " 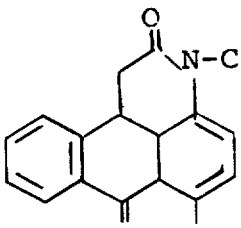 " |
| 9 | Claim 1 40-45 | "-CH$_2$CH$_2$-SO$_2$-CH$_6$H$_5$, -CH$_2$O-C$_6$H$_5$," should read --- -CH$_2$CH$_2$-SO$_2$CH$_3$, -CH$_2$CH$_2$SO$_2$-C$_6$H$_5$, -CH$_2$-O-C$_6$H$_5$, --- |

UNITED STATES PATENT OFFICE
CERTIFICATE OF CORRECTION

Patent No. U.S. 3,534,038     Dated October 13, 1970

Inventor(s) Heinz Machatzke     PAGE -3

It is certified that error appears in the above-identified patent and that said Letters Patent are hereby corrected as shown below:

| Column | Line | Error |
|---|---|---|
| 9 | Claim 2 | "corrre-" should read --- corre --- |
| 9 | Claim 2 | "in which" is missing after the formula |
| 10 | Claim 5 | 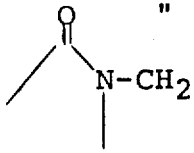 should read 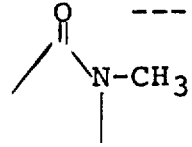 |

SIGNED AND SEALED
MAR 2 1971

(SEAL)
Attest:

Edward M. Fletcher, Jr.
Attesting Officer

WILLIAM E. SCHUYLER, JR.
Commissioner of Patents